United States Patent [19]

Bennett et al.

[11] Patent Number: 4,499,785
[45] Date of Patent: Feb. 19, 1985

[54] MOLDED BALL SOCKET TERMINAL (CONNECTING BELTS)

[75] Inventors: William G. Bennett, Troy; Arthur L. Spease, Livonia, both of Mich.

[73] Assignee: Teleflex Incorporated, Limerick, Pa.

[21] Appl. No.: 392,516

[22] Filed: Jun. 28, 1982

[51] Int. Cl.³ ............................................. F16C 1/14
[52] U.S. Cl. ............................. 74/501 R; 74/501 P; 403/67; 403/141; 403/163
[58] Field of Search ............... 74/501 R, 501 P, 502; 403/67, 71, 76, 141, 122, 163

[56] References Cited

U.S. PATENT DOCUMENTS

| | | | |
|---|---|---|---|
| 2,323,624 | 7/1943 | Schall | 403/71 |
| 3,787,127 | 1/1974 | Cutler | 403/133 |
| 4,111,570 | 9/1978 | Morel | 403/141 X |
| 4,327,600 | 5/1982 | Bennett | 74/501 R |

Primary Examiner—Kenneth J. Dorner
Attorney, Agent, or Firm—Harold W. Milton, Jr.

[57] ABSTRACT

A motion transmitting remote control assembly (10) for transmitting motion in a curved path including a conduit (12) and rod member (16) movably supported by the conduit (12) and extending therefrom to provide a variable extending length of the rod member (16) between the conduit (12) and one end (18) of the rod member (16). An integral terminal member (22) is disposed on the extended length of the rod member 16 for operatively interconnecting the rod member (16) and a control member (24). The terminal member (22) includes a pocket (28) defining an axis and lips (30) disposed about the pocket (b 28) for retaining a portion of the control member (24) within the pocket (28). A plurality of slots (32) extend from the pocket (28) substantially to the outer surface of the terminal member (22) and are parallel to the axis defined by the pocket (28) so as to divide the terminal member (22) into a plurality of portions (36, 38). The assembly (10) is characterized by the terminal member (22) including integral belts (34) connecting at least two of the portions (36, 38) and extending across at least one of the slots (32) for restraining the outward flexure of the connected portions (36, 38).

11 Claims, 4 Drawing Figures

MOLDED BALL SOCKET TERMINAL (CONNECTING BELTS)

TECHNICAL FIELD

This invention relates to a motion transmitting remote control assembly for transmitting motion in a curved path. More particularly, the instant invention relates to a terminal member to be disposed in a core element to connect the core element to a control member.

BACKGROUND ART

Motion transmitting remote control assemblies are well adapted for use in such systems as brakes and transmissions. Generally, a core element is supported for reciprocating linear movement within a conduit. A terminal member or connector interconnects the core element and a control member, such as a brake or transmission actuator. The control member may take the form of a lever mounted for pivotting movement about a shaft defining pivot axis. The terminal member is connected to the lever for pivotting movement relative thereto whereby the linear motion of the core element is translated into the pivotting movement of the lever. An example of such an assembly is disclosed in the U.S. Pat. No. 3,787,127 to Cutler. The Cutlet patent teaches a terminal member comprising a metallic casing and a resilient bearing disposed in the casing and having a pocket therein for retaining a ball pin extending from a control member. However, terminal members are now manufactured as integral members of molded polymeric material. When the terminal member is molded as an integral member upon the core element, slots are formed about the pocket to allow for sufficient flexibility for the insertion of the ball pin into the pocket. A problem arises regarding the control of the outward flexure of the portions of the pocket about each pair of the slots. The instant invention provides means for effectively restraining the outward flexure of these portions.

STATEMENT OF INVENTION

According to the present invention, there is provided a motion transmitting remote control assembly for transmitting motion in a curved path, the assembly including guide means and core means movably supported by the guide means and extending therefrom to provide a variable extending length of the core means between the guide means and one end of the core means. An integral terminal member is disposed on the extended length for operatively interconnecting the core means and a control member. The terminal member includes a pocket defining an axis defined by the pocket and retaining means for retaining a portion of the control member within the pocket and a plurality of slots extending from the pocket substantially to the outer surface of the terminal member and being parallel to the axis so as to divide the terminal member into a plurality of portions. The assembly is characterized by the terminal member including integral belt means connecting at least two of the portions and extending across at least one of the slots for restraining the outward flexure of the connected portions.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
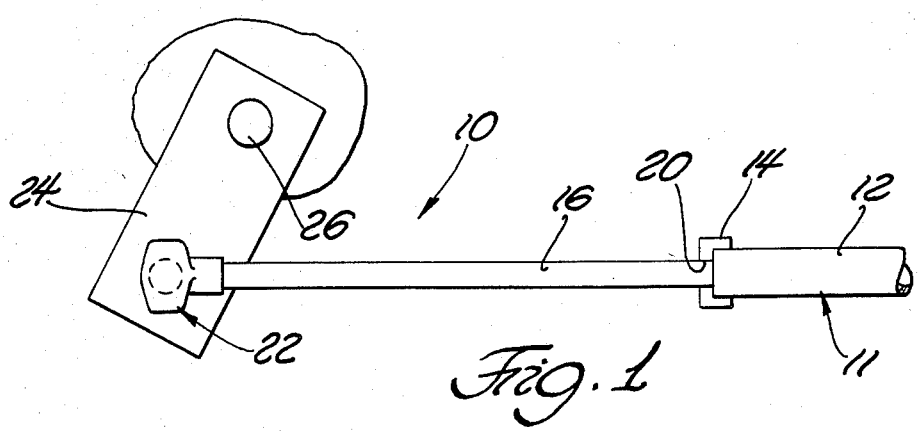
FIG. 1 is a schematic elevational view of a motion transmitting remote control assembly connected to a control member by a terminal member constructed in accordance with the instant invention.

A motion transmitting remote control assembly for transmitting motion in a curved path is generally shown at 10. The assembly 10 includes guide means generally indicated at 11, the guide means 11 including a conduit 12 having a wiper 14 mounted on the end thereof. The conduit 12 is a tube member fixedly mounted for pivotal movement on a flexible conduit, the flexible conduit supporting a flexible core element therein for linear movement therethrough. The assembly 10 further includes core means including the flexible core element and a rod member 16 secured to the end thereof. The rod member 16 is movably supported by the tube member 12 and wiper 14 and extends therefrom to provide a variable extending length of the rod member 16 between the wiper 14 and one end 18 of the rod member 16. In other words, the rod member 16 is supported within the tube member 12 for reciprocating movement to provide a varible extending length of the rod member 16. The wiper 14 includes an opening 20 therethrough, the rod member 16 extending through the opening 20. The wiper 14 prevents foreign particles from entering the tube member 12 which would inhibit the free linear motion of the rod member 16 within the tube member 12.

A molded integral terminal member, generally indicated at 22, is disposed on the extended length of the rod member 16 for operatively interconnecting the rod member 16 and a control member 24. The control member 24 is a lever supported upon a rotatable actuating shaft 26. The lever 24 includes a ball pin 27 extending therefrom, as shown in phantom in FIG. 4. The terminal member 22 includes a pocket 28 for retaining the ball pin 27 therein. Upon longitudinal movement of the rod member 16, the lever 24 is rotated which, in turn, rotates the actuating shaft 26.

Figure 2:
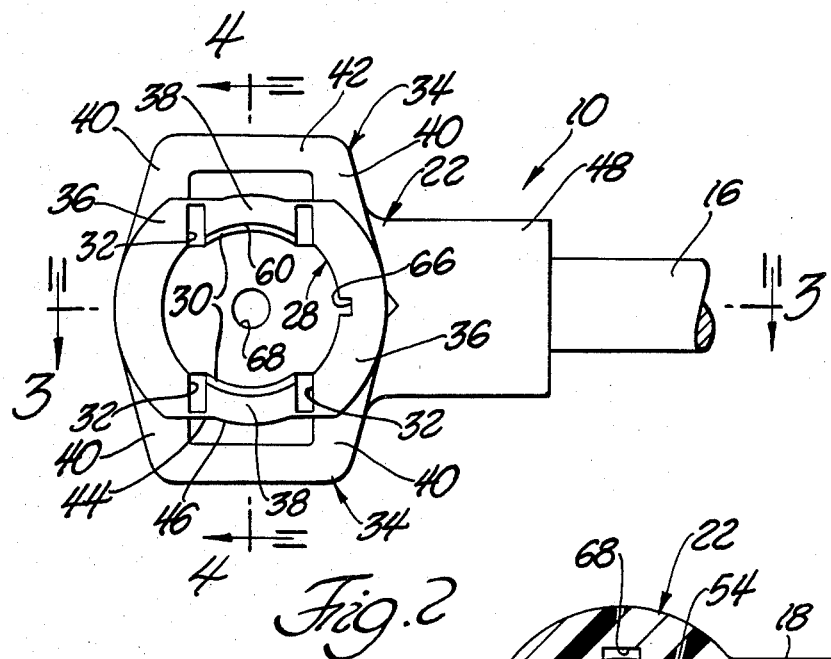
FIG. 2 is a an enlarged fragmentary plan view of the terminal member of the instant invention.
Figure 3:
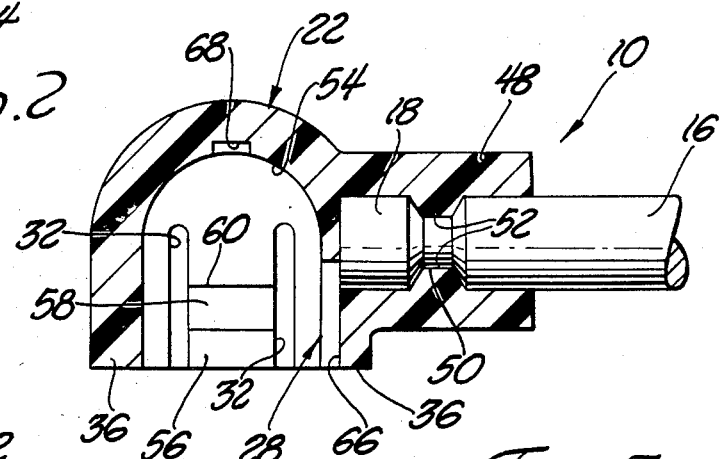
FIG. 3 is a fragmentary cross-sectional view taken substantially along line 3—3 of FIG. 2.
Figure 4:
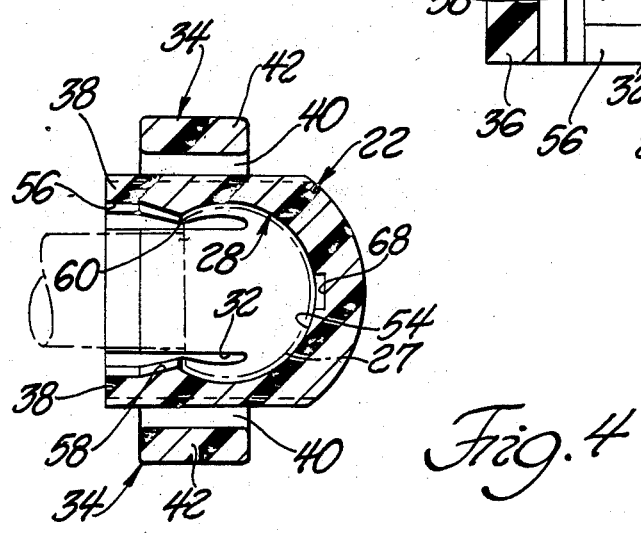
FIG. 4 is a cross-sectional view taken substantially along lines 4—4 of FIG. 2.

As shown in FIGS. 2 through 4, the pocket 28 defines an axis which is substantially parallel to the axis of rotation defined by the actuating shaft 26 when the terminal member 22 is mounted on the ball pin 27. The terminal member 22 further includes retaining means 30 for retaining a portion of the ball pin 27 within the pocket 28 and a plurality of slots 32 extending from the pocket 28 substantially to the outer surface of the terminal member 22. The slots 32 are parallel to the axis of the pocket 28 so as to divide the terminal member 22 into a plurality of portions. The assembly 10 is characterized by the terminal member 22 including integral belt means, generally indicated at 34, connecting at least two of the portions defined by the slots 32 and extending across at least one of the slots 32 for restraining the outward flexure of the connected portions.

More specifically, the belt means 34 includes two belts 34 extending between and interconnecting two outward portions 36 disposed on opposite sides of the intermediate portions 38, the portions 36 and 38 being defined by the slots 32. The belts 34 extend across the slots 32 on either side of the intermediate portions 38. The belts 34 include first sections 40 extending from the outward portions 36 and an elongated second section 42 extending therebetween. The elongated second sections 42 are spaced from the outer surface of each intermediate portion 38. In other words, the first sections 40 extend outwardly from each outward portion 36 of the terminal member 22 and are interconnected by the integral elongated second sections 42. The belts 34 provide a bridge which interconnects the outward portions 36 about each pair of slots 32 and are specifically rigid so as to control the outward flexure of the outward portions 36.

The terminal member 22 includes two pair of slots 32 disposed opposite to one another on opposite sides of the pocket 28 to define two of the intermediate portions 38, the intermediate portions 38 being disposed opposite to one another about the pocket 28. The outward portions 36 are defined by two oppositely disposed outward and integral portions 36 extending about the pocket 28 with one end of the outward portions 36 being adjacent to one of the intermediate portions 38 and being connected by one of the belts 34. The other end of the outward portions 36 are adjacent the other of the intermediate portions 38 amd connected by the other of the belts 34. Each pair of slots 32 are aligned with one another so as to be disposed in spaced parallel planes, as shown in FIG. 2.

The outer surface of each of the intermediate portions 38 includes a flat portion 44 adjacent each of the slots 32. The outer surface of each of the intermediate portions 38 further include an outwardly curved portion 46 extending between the flat portions 44 and spaced from the adjacent belt 34.

The terminal member 22 includes a neck portion 48. The rod member 16 has an end portion fixedly secured within the neck portion 48 which defines the line of force. The line of force is perpendicular relative to the axis defined by the pocket 28. The rod member 16 includes an annular recessed portion 50. The neck portion 48 includes an annular projection 52 which engages the recessed portion 50 of the rod member 16 thereby retaining the end portion 18 of the rod member 16 within the terminal member 22. In this way, the rod member 16 provides linear force which is perpendicular to the axis about which the terminal member 22 rotates relative to the lever 24. This relationship of the line of force defined by the rod member 16 and the axis of rotation defined by the pocket 28 results in stresses causing flexure of the poutward portions 36. The belts 34 of the instant invention interconnects the outward portions 36 about each pair of slots 32 and intermediate portions 38 to control the outward flexure of the outward portions 36 during the reciprocating movement of the rod member 26 so as to retain the terminal member 22 upon the ball pin 27 of the lever 24.

The pocket 28 includes an internal substantially hemispherical portion 54 and an external cylindrical portion 56. The pocket 28 further includes a frustoconical portion 58 therebetween. A circumferential edge portion 60 is between the hemispherical portion 54 and the frustoconical portion 58. The restraining means includes a lip 30 extending into the pocket 28 from the circumferential edge 60 wherein each lip 30 extends into the pocket 28 from each of the enclosed intermediate portions 38. The lips 30 extend between each of the enclosed slots 32. Upon connecting the terminal member 32 to the lever 24, the ball pin 27 is retained within the hemispherical portion 54 of the pocket 28 by the lips 30. The slots 32 about each intermediate portion 38 allows for sufficient flexibility of the intermediate portions 38 to allow for the insertion of the ball pin 27 into the hemispherical portions 54 of the pocket 28. The belts 34 provide sufficient restraint of the flexibility of the outward portions 36 to retain the ball pin 27 within the pocket 28 during reciprocating movement of the rod member 16.

The pocket 28 includes a groove 66 in the interior thereof disposed on a line parallel relative to the line of force defined by the rod member 16. Lubricant can be disposed within the groove 66 to lubricate the surfaces of the ball pin and the pocket 28.

The terminal member 22 is an integral molded member of organic polymeric material. During the molding process of the terminal member 22, a mandrel may be used to form the pocket 28. During the molding process the mandrel may form a smaller pocket 68 within the pocket 28.

In operation, the belts 34 provide a high loadcarrying ability to the pocket 28 and to the terminal member 22. Therefore, the instant invention is well adapted for uses such as with push-pull assemblies of manual transmissions. Additionally, the spacing between the elongated second portions 42 of the belts 34 and the curved outer surface 46 of each intermediate portion 38 allows for an insertion of a U-shaped clip to lock the ball pin within the pocket 28. Alternatively, other means besides a U-shaped clip may be used as auxiliary retaining means for retaining the ball pin within the pocket 28.

The instant invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are not to be in any way limiting, the invention may be practiced otherwise than as specifically described.

The embodiments of the invention in which an exclusive property or privilege is claimed are defined as follows:

1. A motion transmitting remote control assembly (10) for transmitting motion in a curved path, said assembly (10) comprising: guide means (11); core means (16) movably supported by said guide means (11) and extending therefrom to provide a variable extending length of said core means (16) between said guide means (11) and one end (18) of said core means (16); and an integral terminal member (22) disposed on said extended length for operatively interconnecting said core means (16) and a control member (24), said terminal member (22) including a pocket (28) defining an axis and retaining means (30) for retaining a portion of the control member (24) within said pocket (28) and a plurality of slots (32) extending from said pocket (28) substantially to the outer surface of said terminal member (22) and being parallel to said axis so as to divide said terminal member (22) into a plurality of portions (36,38) and characterized by said terminal member (22) including integral belt means (34) connecting at least two of said portions (36,38) for restraining the outward flexure of said connected portion (36,38), said terminal member including two outward portions (36) and two intermediate portions (38) therebetween, said belt means (34) including at least one belt (34) extending between and interconnecting said outward portions (36) disposed on oppposite sides of one of said intermediate portions (38) said belt means (34) extending across said slots (32) on either side of said intermediate portion (38), said intermediate portion (38) having an outer surface and said belt means including first sections (40) extending from said outward portions (36) and an elongated second section (42) extending therebetween and spaced from said outer surface of said intermediate portion (38).

2. An assembly as set forth in any one of claims 1 further characterized by said terminal member (22) being of organic polymeric material.

3. An assembly as set forth in claim 1 further characterized by said terminal member (22) including two pair of said slots (32) disposed opposite to one another on opposite sides of said pocket (28) to define two of said intermediate portions (38) disposed opposite to one another about said pocket (28).

4. An assembly as set forth in claim 3 further characterized by said outward portions (36) being defined by two oppositely disposed outward and integral portions (36) extending about said pocket (28) with the ends of said outward portions (36) adjacent one of said intermediate portions (38) being connected by one of said belts (34) and the other end of said outward portions (36) adjacent the other of said intermediate portions (38) being connected by the other of said belts (34).

5. An assembly as set forth in claim 4 further characterized by said pair of slots (32) being aligned with one another so as to be disposed in spaced parallel planes.

6. An assembly as set forth in claim 5 further characterized by said outer surface of each of said intermediate portions (38) including a flat portion (44) adjacent each of said slots (32) defining said intemediate portions (38) and an outwardly curved portion (46) extending between said flat portions (44) and spaced from the adjacent one of said belts (34).

7. An assembly as set forth in any one of claims 1 or 6 further characterized by said terminal member (22) including a neck portion (48), said core means (16) having an end portion fixedly secured within said neck portion (48) and defining a line of force being perpendicular relative to said axis, said slots (32) extending perpendicularly away from said line of force.

8. An assembly as set forth in claim 1 further characterized by said pocket (28) including an internal hemispherical portion (54) and an external cylindrical portion (56) and a frustoconical portion (58) therebetween and defining a circumferential edge portion (60) between said hemispherical portion (54) and said frustoconical portion (58).

9. An assembly as set forth in claim 8 further characterized by said restraining means (30) including a lip extending into said pocket (28) from at least a portion of said circumferential edge (60).

10. An assembly as set forth in claim 9 further characterized by said terminal member including four slots (32) defining an intermediate portion (38) between each pair of said slots (32), said belt means (34) including two oppositely disposed belts (34), each of said belts (34) extending between two outward portions (36) in a direction opposite to the other of said belts (34) and enclosing a pair of said slots (32) and one of said intermediate portions (38) therebetween, said terminal member (22) including a neck portion (48) extending from one of said outward portions (36) perpendicularly relative to said axis, said retaining means (30) including a lip (30) extending into said pocket (28) from each of said enclosed intermediate portions (38) and between each of said enclosed slots (32).

11. An assembly as set forth in claim 1 further characterized by including a groove (66) in the interior of said pocket (28) on said line of force.

* * * * *